No. 676,601. Patented June 18, 1901.
G. H. CONANT.
DUMP WEIGHING SCALE.
(Application filed Apr. 1, 1901.)
(No Model.) 2 Sheets—Sheet 1.
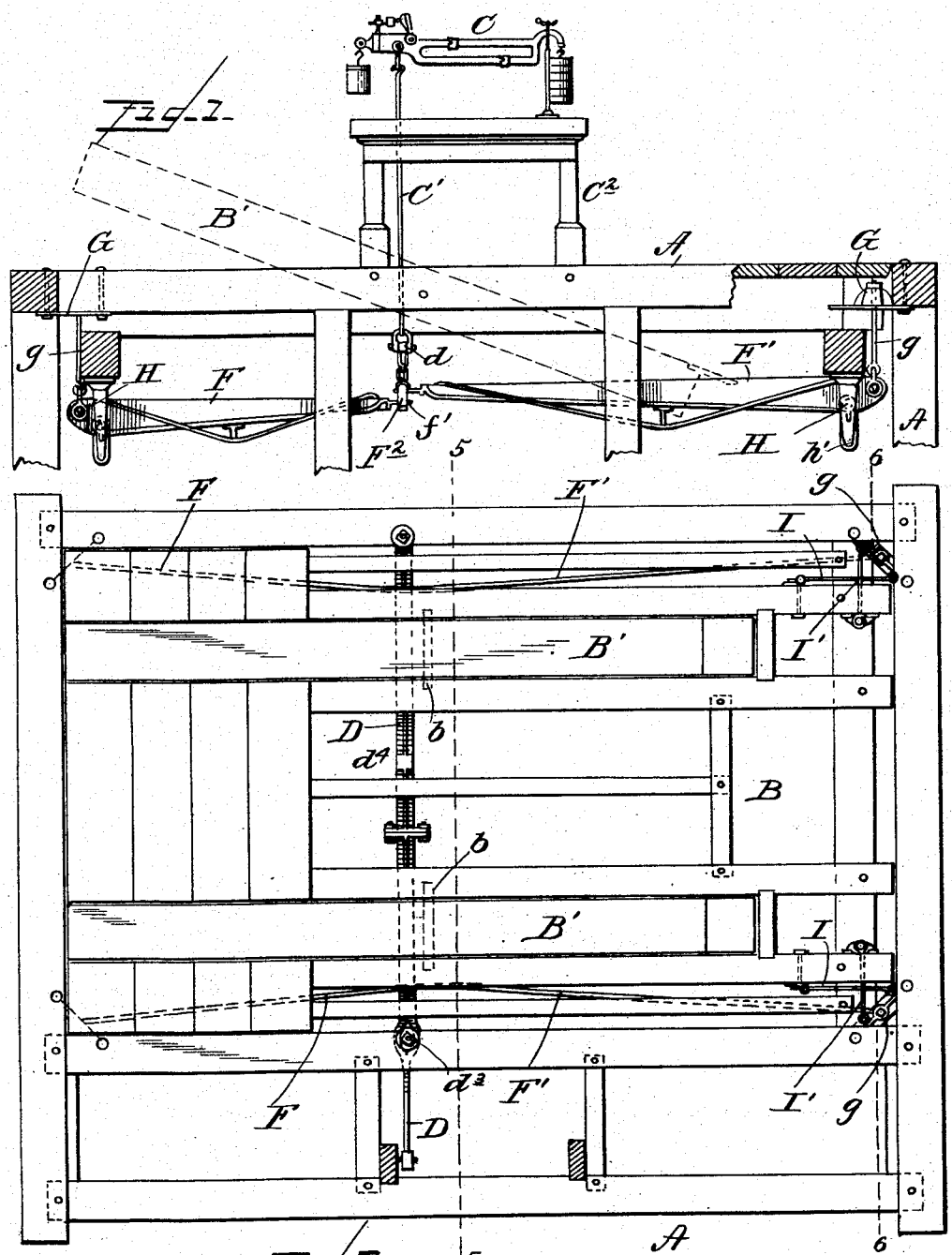

No. 676,601. Patented June 18, 1901.
G. H. CONANT.
DUMP WEIGHING SCALE.
(Application filed Apr. 1, 1901.)
(No Model.) 2 Sheets—Sheet 2.
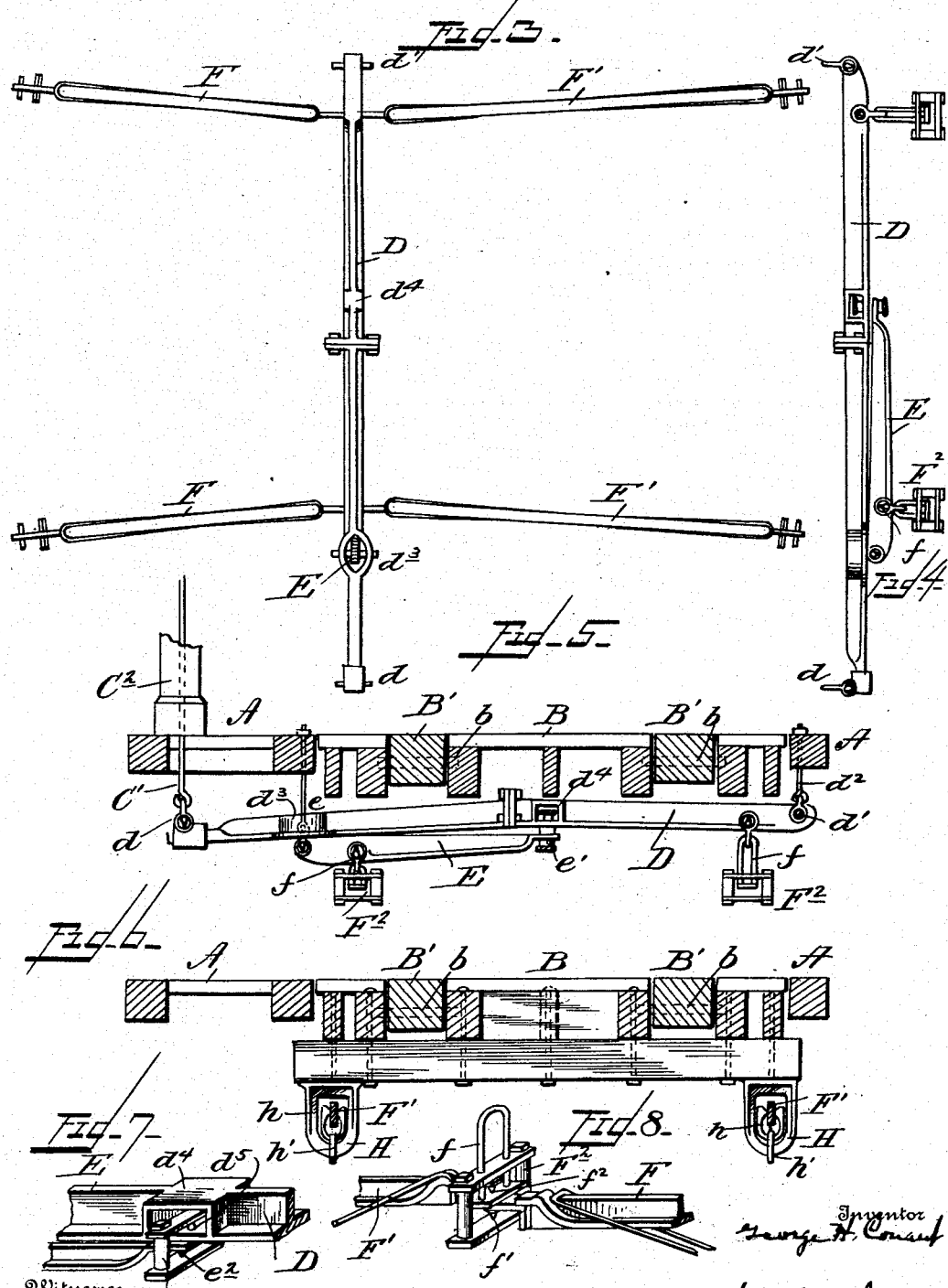

UNITED STATES PATENT OFFICE.

GEORGE H. CONANT, OF MINNEAPOLIS, MINNESOTA, ASSIGNOR TO THE E. & T. FAIRBANKS & CO., OF ST. JOHNSBURY, VERMONT.

DUMP WEIGHING-SCALE.

SPECIFICATION forming part of Letters Patent No. 676,601, dated June 18, 1901.

Application filed April 1, 1901. Serial No. 53,890. (No model.)

*To all whom it may concern:*

Be it known that I, GEORGE H. CONANT, a citizen of the United States, residing at Minneapolis, in the county of Hennepin, State of Minnesota, have invented certain new and useful Improvements in Dump Weighing-Scales, of which the following is a description, reference being had to the accompanying drawings and to the letters of reference marked thereon.

My invention relates to that class of weighing-scales commonly known as "dump-scales," which are used for weighing grain in wagons and then dumping the load either through an opening in the platform or over the end of the scale.

The objects of the invention are to provide a construction in which there shall be as large a space as possible between the scale-levers, so that there will be ample room for the dump-sticks to swing down, and also to provide a scale lever mechanism not liable to affect the accuracy of the scale should the foundation get out of level by the settling of the building, &c. These objects I accomplish by the construction illustrated in the accompanying drawings, in which—

Figure 1 is a front elevation of a scale having my improvements applied. Fig. 2 is a plan thereof with part of the planking removed. Fig. 3 is a plan of the lever mechanism. Fig. 4 is a side elevation of the lever mechanism. Fig. 5 is a cross-section on line 5 5, Fig. 2. Fig. 6 is a section on line 6 6, Fig. 2. Fig. 7 is a detail perspective of the connection between the transmitting-lever and its underlying connecting-lever, and Fig. 8 is a similar view of the meeting ends of a pair of the multiplying-levers.

A designates the supporting-framework, and B the scale-platform, on which are pivoted at $b'$ $b'$ the two dump-sticks B' B'. C represents the weigh-beam mechanism, C' its operating-rod, and $C^2$ the supporting-standard. All of the above-described mechanism is constructed and operates in the usual manner and need not be further described. Moreover, I have omitted the mechanism for operating the dump-sticks, as nothing is claimed thereon.

D designates the transmitting-lever, pivotally connected at its free end to the lower end of vertical rod C' by means of a link $d$, and the opposite end of said lever is fulcrumed on a link $d'$ on the lower end of a vertical bolt $d^2$, mounted on frame A opposite the standard $C^2$. The lever D is provided near its free end with a vertical opening $d^3$ and near its middle with a horizontal opening $d^4$.

E is the connecting-lever underlying the transmitting-lever D between its two openings $d^3$ $d^4$ and fulcrumed at one end on the lower end of a bolt $e$, which is mounted on the frame A, near its standard $C^2$, while a box-link $e'$ connects the free end of this lever E with the lever D through the opening $d^4$, as clearly shown in Fig. 7. The portions of the levers D E which contact with the cross-bars of the box-link $e'$ are provided with conical bearing-points $d^5$ $e^2$, respectively, to lessen friction.

F F' F F' represent two pairs of multiplying-levers, the levers F F of each pair being the shorter, and the overlapping ends of these levers F F' meeting below the levers D E, respectively, (see Figs. 1, 3, and 4,) and connected together, as shown in Fig. 8, by box-link $F^2$, a second link, $f$, extending up through the top cross-piece of each link $F^2$ and hung, respectively, on the levers D E, (see Fig. 5,) near their fulcrum-points. The levers F F' are provided with conical points $f'$ $f^2$, the point $f'$ bearing on the lower cross-piece of link $F^2$ and the point $f^2$ bearing on the lower cross-piece of link $f$.

The outer ends of the levers F F' are fulcrumed on the lower ends of bolts $g$, carried by the diagonal brackets G, bolted in the four corners of the frame A, as shown in Figs. 1 and 2.

The four corners of the scale-platform B are provided with depending yoke-like brackets H, through which freely pass the said levers F F', (see Fig. 6,) and the levers sustain the weight of the platform through the medium of the pairs of links $h$ $h'$, the latter being engaged by the lower end of yokes H.

It has been found that by connecting the multiplying-levers to the rod C' by means of the levers D E instead of by a pipe-lever or torsion-lever, as heretofore, the accuracy of the scale is not affected by the settling of the frame, like where the pipe-lever is employed.

The horizontal vibrations of platform B are limited, as usual, by the links I I'.

It will be seen that lever E is practically a member of lever D and that the two together form a compound lever the member E of which serves to transfer the weight from the pair of multiplying-levers F F' which lie near the free end of lever D from the outer end thereof to a point near the middle, as at e'.

Having thus described my invention, what I claim as new, and desire to secure by Letters Patent, is—

1. A scale comprising a frame, a platform in an opening therein, scale-beam mechanism having a downwardly-extending operating-rod, two pairs of multiplying-levers hung at their outer ends from the frame below the platform, and meeting and linked together at their free ends, brackets depending from the four corners of the platform and engaging the said four levers near their outer ends, a transmitting-lever hung at its outer end from the frame opposite to the beam-operating rod and crossing the meeting ends of both pairs of said multiplying-levers, pivotally connected near its fulcrum to the meeting ends of the adjacent pair of multiplying-levers and at its opposite end connected to the lower end of said operating-rod, and a short lever underlying the transmitting-lever in the plane thereof, fulcrumed at its outer end to the frame behind the free end of the transmitting-lever, pivotally linked at its inner free end to said transmitting-lever, and also pivotally connected near its fulcrum to the crossed ends of the other pair of multiplying-levers; substantially as described.

2. The combination with the frame, the platform, and two pairs of multiplying-levers hung from the frame, supporting the platform at its four corners, and the free ends of the levers of each pair meeting, of a transmitting-lever hung at its outer end from the frame, crossing the meeting ends of both pairs of levers, and pivotally connected near its fulcrum to the free ends of the outermost pair of said levers, the said transmitting-lever being connected at its free end to the scale-beam mechanism, and provided with a vertical opening, and between said opening and its fulcrum with a horizontal opening, a short lever hung from the frame through said vertical opening, coupled to the free ends of the inner pair of multiplying-levers, and a box-link extending through the said horizontal opening and around the inner free end of said short lever; substantially as described.

In testimony whereof I affix my signature in presence of two witnesses.

GEORGE H. CONANT.

Witnesses:
P. A. PAULSON,
GEO. R. BAKER.